United States Patent [19]

Inami

[11] Patent Number: 5,339,083
[45] Date of Patent: Aug. 16, 1994

[54] TRANSMIT-RECEIVE MODULE

[75] Inventor: Kazuyoshi Inami, Kanagawa, Japan

[73] Assignee: Mitsubishi Denki Kasbushiki Kaisha, Tokyo, Japan

[21] Appl. No.: 939,019

[22] Filed: Sep. 2, 1992

[30] Foreign Application Priority Data

Sep. 4, 1991 [JP] Japan .................. 3-070816[U]

[51] Int. Cl.$^5$ .............................. G01S 3/36
[52] U.S. Cl. .................... 342/157; 342/372
[58] Field of Search ............ 342/157, 371, 372

[56] References Cited

U.S. PATENT DOCUMENTS

| 4,951,060 | 8/1990 | Cohn | 342/175 |
| 5,023,634 | 6/1991 | Nishioka et al. | 342/368 |
| 5,113,161 | 5/1992 | Inami . | |
| 5,124,712 | 6/1992 | Caille et al. | 342/368 |
| 5,276,452 | 1/1994 | Schuss et al. | 342/371 |
| 5,283,587 | 2/1994 | Hirshfield et al. | 342/372 |

OTHER PUBLICATIONS

Proceedings of the IEEE vo. 79, No. 3, Mar. 1991 pp. 308–341 Transmit/Receive Module Technology for X-Band Active Array Radar.
Electronic Engineering vol. 56, No. 695 Nov. 1984, Southend-On-Sea, Essex, G. B. "Transmit/Receive Module Using GaAs ICs".
1989 IEEE MIT-S International Microwave Symposium Digest, vol. I Jun. 1989 pp. 127–130 "MMIC Phase-Shifters and Amplifiers for Millimeter-Wavelength Active Arrays".
"New Packaging Goes Modular", Microwaves & RF, Jun. 1986.

Primary Examiner—John B. Sotomayor
Attorney, Agent, or Firm—Wolf, Greenfield & Sacks

[57] ABSTRACT

A transmit-receive module for a phased array radar comprises a phase shifter, high-power amplifier, low-noise amplifier, and duplexer which are constituted with field-effect transistors and a control circuit for processing negative-voltage signal data to control and drive the above RF devices.

Therefore, a compact small-power-consumption transmit-receive module is obtained because a level conversion circuit for driving the RF devices is disused and the RF devices are directly driven by a control circuit. Moreover, the entire transmit-receive module can be downsized because a plurality of unit arrays are constituted with one control circuit.

22 Claims, 10 Drawing Sheets 5,339,083

TRANSMIT-RECEIVE MODULE

BACKGROUND OF THE INVENTION

1. Field of the Invention

The present invention relates to a transmit-receive module used for a phased array radar which is an electronic control antenna.

2. Description of the Prior Art

FIG. 16 is a block diagram of an existing phase-scanning phased array radar, FIG. 12 is a block diagram of an existing transmit-receive module which may be used in the phased array radar of FIG. 16, FIG. 13 is a schematic of a field effect transistor amplifier which may be used in the transmit receive module of FIG. 12, FIG. 14 is a schematic of a single-pole double-throw field effect transistor switch which may be used in the transmit receive module of FIG. 12, and FIG. 15 is a schematic diagram of a loading-type field effect transistor phase shifter which may be used in the transmit-receive module of FIG. 12.

In FIG. 12, numeral 1 is a digital phase shifter for varying the phase of RF signals according to a digital input, 2a and 2b are duplexers for switching between a transmit and receive propagation path for RF signals, 3 is a high-power amplifier for amplifying transmission RF signals up to a predetermined level, 4 is a low-noise amplifier for amplifying received signals at a low noise, 5 is a control circuit for outputting predetermined phase setting signals 12 in accordance with external control signals 10, 6 is a level conversion circuit for converting output signals 12 of the control circuit 5 to an output voltage 13 for driving the digital phase shifter 1, duplexers 2a and 2b, high-power amplifier 3, and low-noise amplifier 4. Numeral 7 is a transmit-receive module comprising the above devices. Numeral 8 is an element antenna for emitting transmission waves into space and receiving radio waves from space. Numerals 9a and 9b are input/output terminals for RF signals, terminals $10_1$, $10_2$, . . . and $10_l$ are control signal input/output terminals for feeding external control signals to the transmit-receive module 7 and sending the signals of the transmit-receive module 7 to the outside. Terminals $11_1$, $11_2$ . . . , and $11_j$ are external power input terminals.

In FIG. 13 there is shown a schematic diagram of an amplifier which may be used as the high-power amplifier 3 or the low-noise amplifier 4 of FIG. 12. Numeral 21 is a field effect transistor. Numerals 22a 22b are inductors, which together with the capacitors 23a and 23b constitute bias circuits 24a and 24b. Numerals 25a and 25b are DC preventing capacitors, 26 is a RF signal input terminal, 27 is an RF signal output terminal for outputting RF signals amplified by the field effect transistor 21, 28a and 28b are resistors which together comprise a bias voltage resistance 29. Numeral 30 is a drain voltage applying terminal, 31 is a negative gate voltage applying terminal, and 32 is a pulse voltage applying terminal for pulse-driving the field effect transistor 21. A problem with the amplifier design according to the prior art is that, for an N-type field effect transistor 21, the gate terminal 31 can only be driven with a negative voltage in order to control the transistor 21.

The single-pole, double-throw (SPDT) switch of FIG. 14 may be used as the duplexers 2a and 2b of the module of FIG. 12. Numerals 33a and 33b are field effect transistors, 34a and 34b are inductors chosen to create a parallel resonance with a capacitor between a drain and source of the field effect transistors 33a and 33b when the field effect transistor is turned off, 35a and 35b are resistors for biasing the gate voltage of the field effect transistors 33a and 33b, 36 is an RF choke inductor, 39 is an RF signal input terminal, 40a and 40b are RF signal output terminals, and 41a and 41b are gate voltage applying terminals for applying the gate voltage to the gate of the field effect transistors 33a and 33b to turn the transistors on or off. A problem with the SPDT switch of the prior art is that, for an N-type field effect transistor, the gate terminals 41a and 41b can only be driven with a negative voltage in order to control the transistors 33a and 33b.

The phase shifter of FIG. 15, may be used as the phase shifter 1 in the transmit-receive module of FIG. 12. Numerals 33c and 33d are field effect transistors, 35c and 35d are resistances for biasing the gate voltage of the field-effect transistors 33c and 33d, 41c and 41d are gate voltage applying terminals for applying the gate voltage to the field-effect transistors 33c and 33d to turn them on or off, 43 is ¼ wavelength transmission line, 44a and 44b are impedance conversion transmission lines for converting the input impedances of the field-effect transistors 33c and 33d into impedances for obtaining a desired phase shift, and 46a and 46b are RF signal input-/output terminals. Similarly, a problem with the phase shifter design of FIG. 15 is that, for an N-type field effect transistors the gate terminals 41c and 41d can only be driven with a negative voltage in order to control the phase shifter.

In the phase scanning phased array radar of FIG. 16 numeral 16 is an exciter for generating RF signals. Numeral 17 is a receiver for processing received RF signals. Numeral 18 is a circulator for switching the propagation paths of transmission and received signals. Numeral 19 is a power supply source for feeding a predetermined supply voltage to the transmit-receive modules $7_1$, $7_2$ . . . , and $7_N$. Numeral 20 is a beam oriented control circuit for outputting phase shift data to the transmit-receive modules $7_1$, $7_2$, . . . $7_N$ so as to form antenna beam patterns. Numeral 47 is an RF signal synthesizing/distributing circuit for distributing RF signals output by the exciter 16 to transmit-receive modules $7_1$, $7_2$, . . . , and $7_N$ and for synthesizing signals received from the transmit-receive modules $7_1$, $7_2$ . . . , and $7_N$. Numeral 48 is a supply voltage feed circuit for feeding the supply voltage output by the power source 19 to the transmit-receive modules $7_1$, $7_2$, . . . , and $7_N$. Numeral 49 is a control signal distributing circuit for feeding the data output by the beam oriented control circuit 20 to the transmit-receive modules $7_1$, $7_2$, . . . , and $7_N$ and collecting the data output by the transmit-receive modules $7_1$, $7_2$, . . . , and $7_N$ to the beam oriented control circuit 20.

The following is the description of the phased array radar's operation. RF signals 100 generated by the exciter 16 are fed to the transmit-receive modules $7_1$ to $7_N$ through the RF signal circulator 18 and RF signal synthesizing/distributing circuit 47. Referring to FIG. 12, the RF signals are input to each T/R module at input 9a where they pass through the digital phase shifter 1 where the signal is shifted in phase by a predetermined phase setting before the signal is fed to the high-power amplifier 3 which is selected with the duplexer 2a, the signal is then amplified up to a predetermined level, and emitted into space through the RF signal input/output terminal 9b and antenna element 8.

A radio wave incoming from space is received by the antenna element 8 and input to the low-noise amplifier 4 via the aid of duplexer 2b, amplified up to a predetermined level at low noise levels, fed to the digital phase shifter 1 via the aid of the duplexer 2a, where it is provided with a predetermined phase shift and output to the receiver 17 through the RF signal input/output terminal 9a via the RF signal synthesizing/distributing circuit 47 and circulator 18 as best shown in FIG. 16, and thereafter detected as a received signal 101.

The predetermined settings of the RF devices 1 to 4 are controlled by a supply voltage 102 output by the power source, 19 in FIG. 16, and fed to the supply voltage input terminals $11_1$ to $11_j$ of the T/R module as shown in FIG. 12 via the supply voltage feed circuit 48. The control data signal 103 output by the beam oriented control circuit 20, in FIG. 16, is fed to the control signal input/output terminals $10_1$ to $10_I$ of the T/R module as shown in FIG. 12 through the control signal distributing circuit 49. Referring to FIG. 12, the control data signals 103 fed to the control signal input/output terminals $10_1$ to $10_I$ are fed to the control circuit 5 where they are provided with predetermined values and timing settings before they are output as parallel signals $12_1$ to $12_K$. These signals are input to the level conversion circuit 6 where they are converted into the appropriate supply voltage level needed for actually driving the RF devices 1 to 4, and output as driving signals $13_1$ to $13_L$, which are fed to the RF devices 1 to 4. The bias supply voltage signals input to the supply voltage input terminals $11_1$ to $11_j$ are fed to the devices 1 to 6 to make each device ready for operation.

As discussed above with respect to the phase-shifter, the SPDT switches and the amplifier of the prior art, a problem with the prior art embodiment of the transmit-receive module is that the level conversion circuit 6 is needed to transform the signals 12 into appropriate levels to drive the RF devices of the prior art.

Because the existing transmit-receive module is constituted as described above, there is a problem in the size and the power consumption of the level conversion circuit 6 required for level conversion of the control signals input to the individual T/R modules because it is necessary to convert each of the parallel signals 121 to $12_K$ into a suitable supply voltage for actually driving the RF devices. Moreover, a phased array radar comprising a plurality of transmit-receive modules operating at high frequencies and coupled with a conformal antenna array, requires that the size of the transmit-receive modules be reduced. However, the size of the level conversion circuit 6 together with the control signal input/output connector and supply voltage connector inhibit the down sizing of the transmit-receive module.

SUMMARY OF THE INVENTION

The present invention's object is to provide a highly efficient compact transmit-receive module by omitting the level conversion circuits from each transmit receive module or alternatively decreasing the number of them. It is another object of the present invention to downsize the entire transmit-receive module by driving a plurality of transmit-receive modules by one control circuit thereby decreasing the number of control-signal and supply-voltage connectors.

To achieve the above objects, the transmit-receive module of the present invention is configured such that the RF devices are directly driven by the control circuit 5 without using any level conversion circuit by applying negative voltage to the power source of the control circuit comprising CMOS gate arrays and converting the output voltage of logic data to a negative potential.

Moreover, the RF devices according to the present invention in the transmit-receive module make it possible to directly drive the devices without any level conversion circuit by applying a negative voltage to the drain and source of a field-effect transistors 33c and 33d of the driven phase shifter 1 and FET 33a and 33b of the duplexers 2a and 2b through a DC preventing capacitor and RF choke inductor so that the gate of the field-effect transistor may be driven by a positive voltage.

Furthermore, the transmit-receive module of the present invention allows for a reduction in the size of the module for use in a phase array radar of high frequencies and formed with conformal antenna arrays by providing a transmit-receive module subarray including a plurality of transmit-receive modules with one control circuit thereby realizing a smaller low-power-consumption phased array radar.

As described above, the transmit-receive module of the present invention allows a phased array radar to be downsized, consume only a little power, use high frequencies, and to be formed with conformal arrays by eliminating the level conversion circuits in each T/R module or decreasing the necessary number of them.

The above and other objects, features, and advantages of the invention will become more apparent from the following description when taken in conjunction with the accompanying drawing.

DESCRIPTION OF THE PREFERRED EMBODIMENTS

Figure 1:
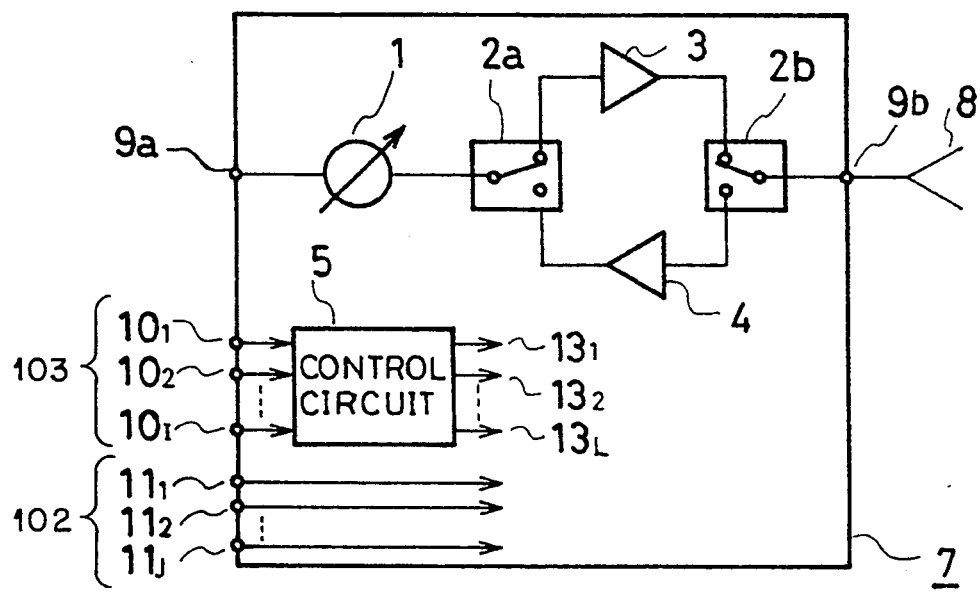
FIG. 1 is a block diagram of a transmit-receive module according to the present invention.
Figure 10:
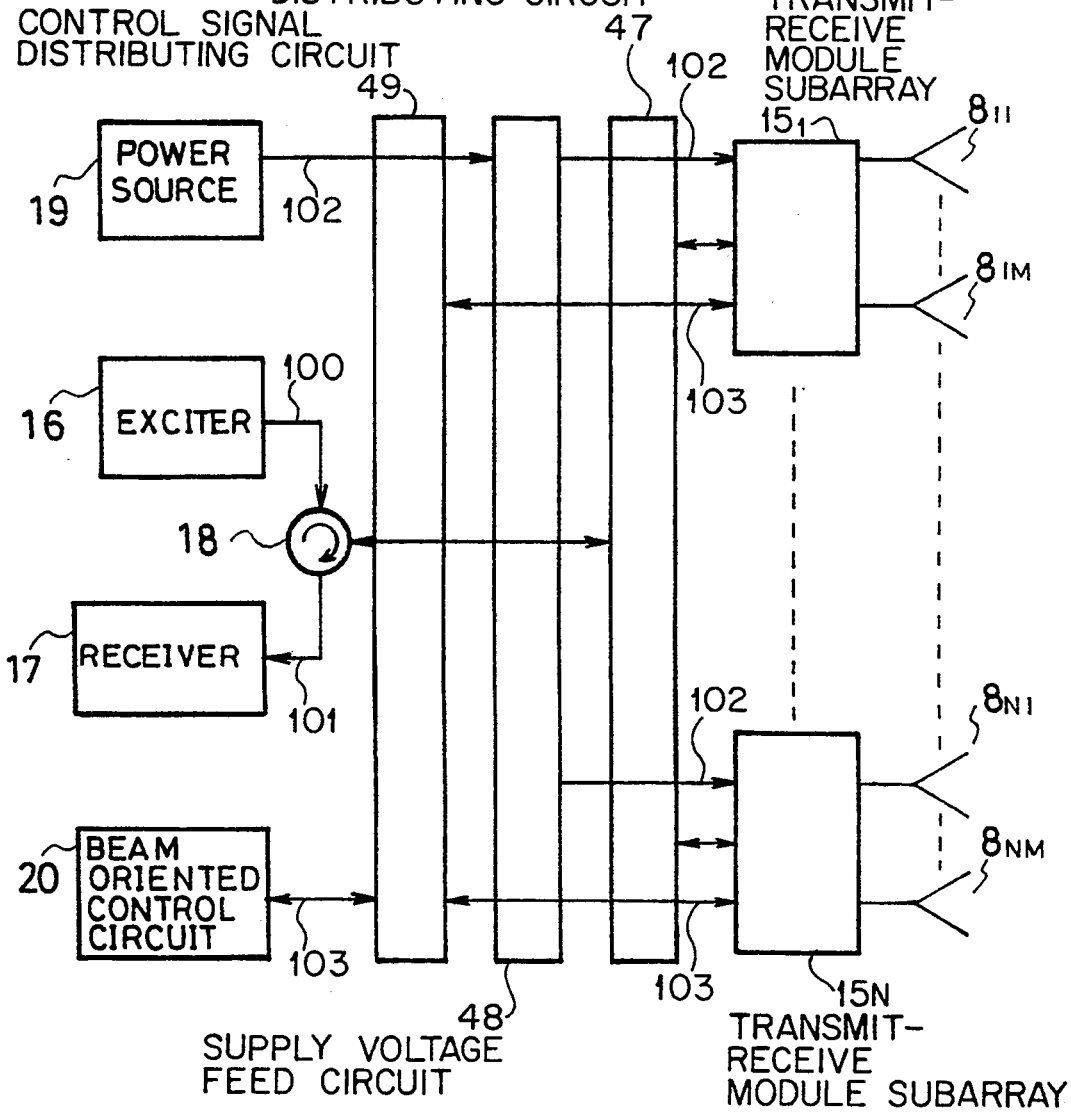
FIG. 10 is a block diagram of a phased array radar according to the present invention.
Figure 12:
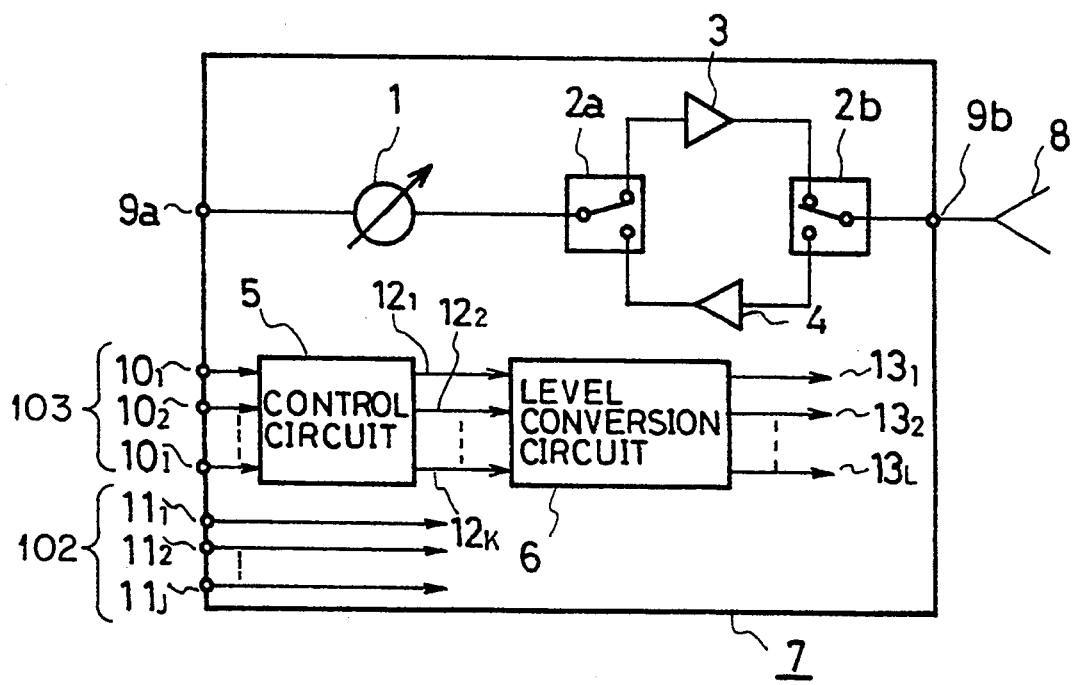
FIG. 12 is a block diagram of a transmit-receive module according to the prior art.

The following is the description of an embodiment of a T/R module which may be used with the present invention. Those portions that are the same as or equivalent to the parts of the prior art are provided with the same symbol and reference numeral. FIG. 1 is a block diagram showing an embodiment of the transmit-receive module 7 according to the present invention. A supply source 102 of control circuit 5, which comprises a CMOS gate array or the like, is operated at a negative voltage and the control data 103 output by the beam oriented control circuit 20, as shown in FIG. 10, is converted to logic data 13 whose output voltage is at a negative potential. Therefore, the prior art level conversion circuit 6, as best shown in FIG. 12, is unnecessary because the control circuit 5 outputs the driving signals $13_1$ to $13_L$ which are capable of directly driving the RF devices 1 to 4. The RF devices 1 to 4 comprise field-effect transistors similar to the devices according to the prior art shown in FIGS. 13 to 15.

Figure 16:
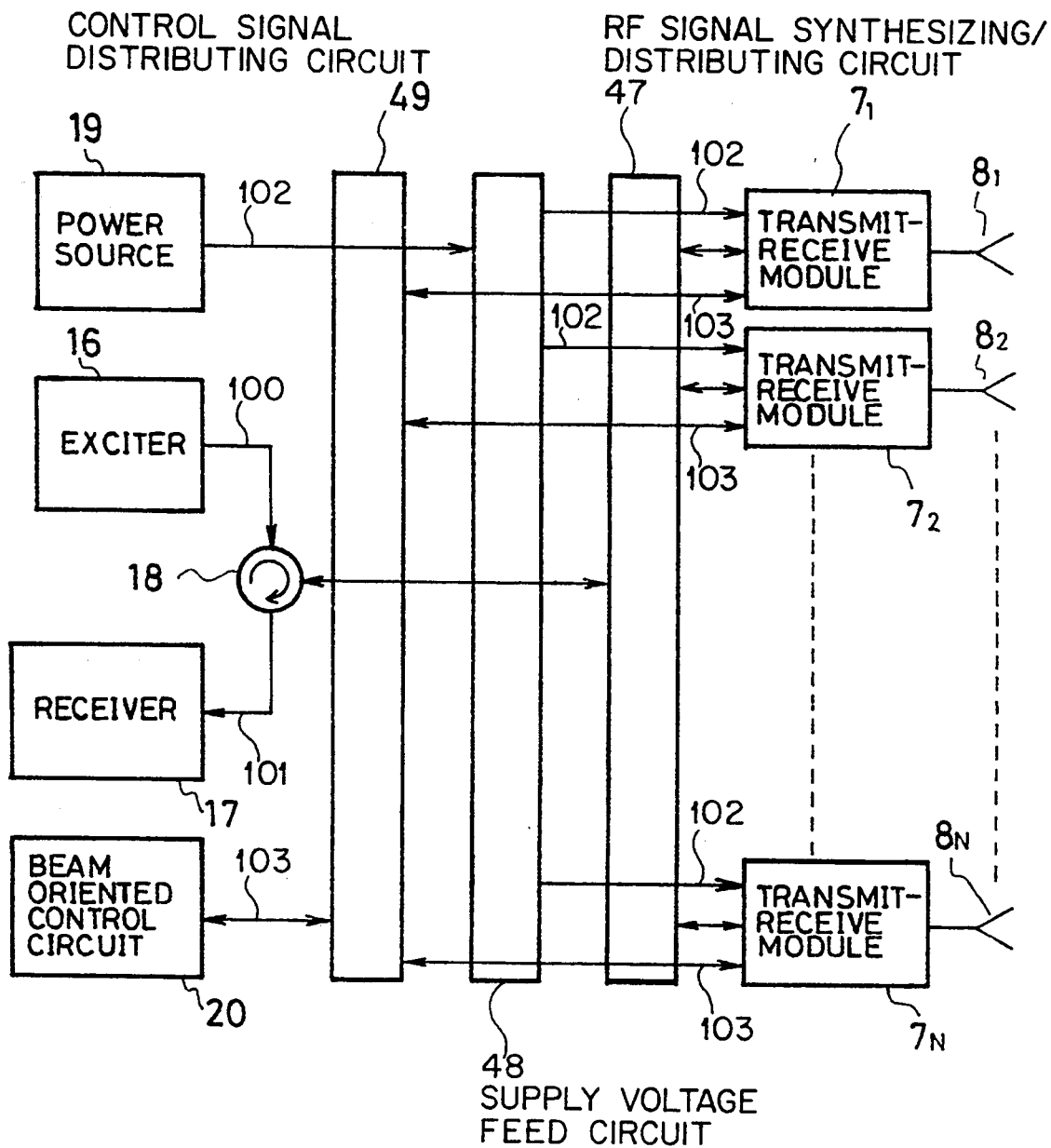
FIG. 16 is a block diagram of a phased array radar.

The following is the description of operation of the transmit-receive module 7. The RF signal 100 output by the exciter 16 in FIG. 16 is input to the transmit-receive modules $7_1$ to $7_N$ via the circulator 18 and RF signal synthesizing/distributing circuit 47. The RF signal is input to the T/R module via the module input/output terminal 9a and to the digital phase shifter 1 where it is provided with a predetermined phase shift before it is input to the high power amplifier 3 selected by the duplexer 2a. The RF signal is then amplified up to a predetermined level, and transmitted into space via the duplexer 2b, RF signal input/output terminal 9b, and antenna element 8.

The radio wave incoming from space are received by the antenna element 8 and input to the low-noise amplifier 4 via the RF signal input/output terminal 9b and duplexer 2b. The received signal is amplified to a predetermined level at low noise levels and fed to the digital phase shifter 1, via the duplexer 2a, where it is provided with predetermined phase shift. The receive signal 101 is ultimately collected at the receiver 17 through the RF signal input/output terminal 9a via the RF signal synthesizing/distributing circuit 47 and circulator 18 as shown in FIG. 16 where it is processed.

The initial state of the RF devices 1 to 4 are controlled by the supply voltage signal 102 fed to the supply voltage input terminals $11_1$ to $11_j$ and the control signal 103 input to the control signal input/output terminals $10_1$ to $10_l$.

Figure 13:
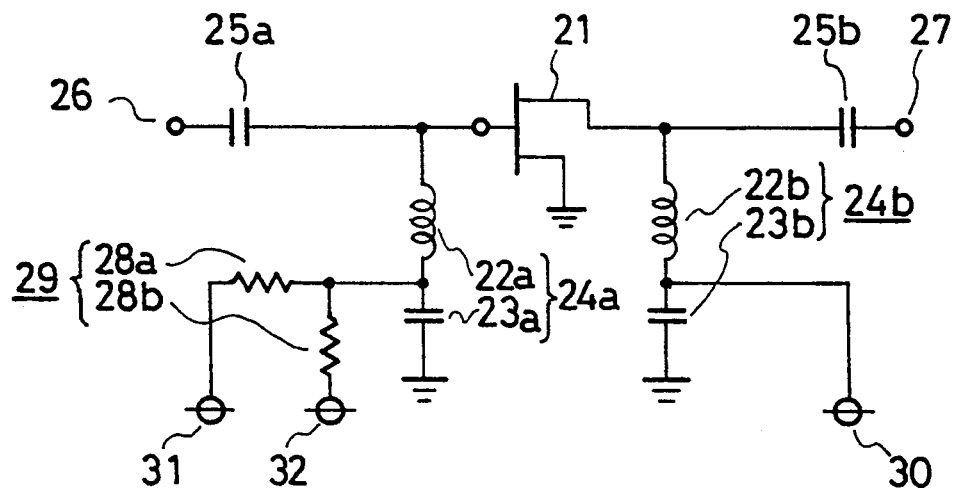
FIG. 13 is a simplified connection diagram of a field-effect transistor amplifier.
Figure 14:
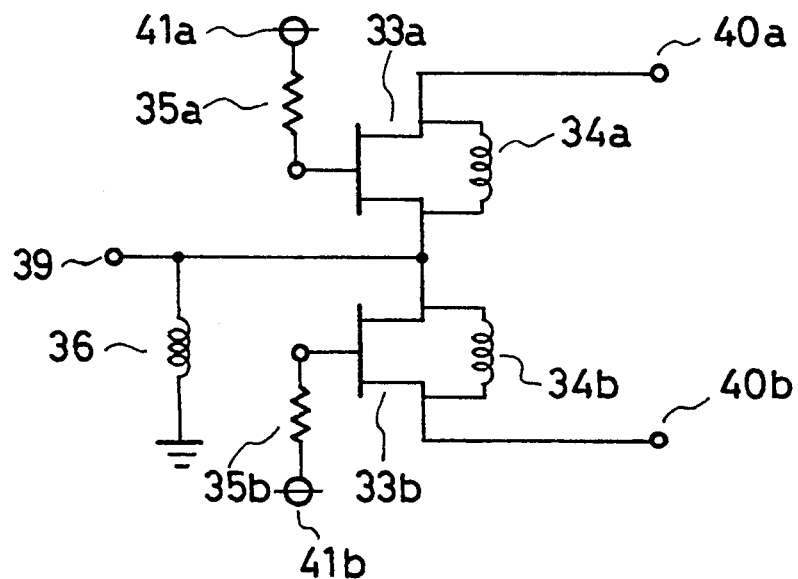
FIG. 14 is a simplified connection diagram of a single-pole double-throw field-effect transistor.
Figure 15:
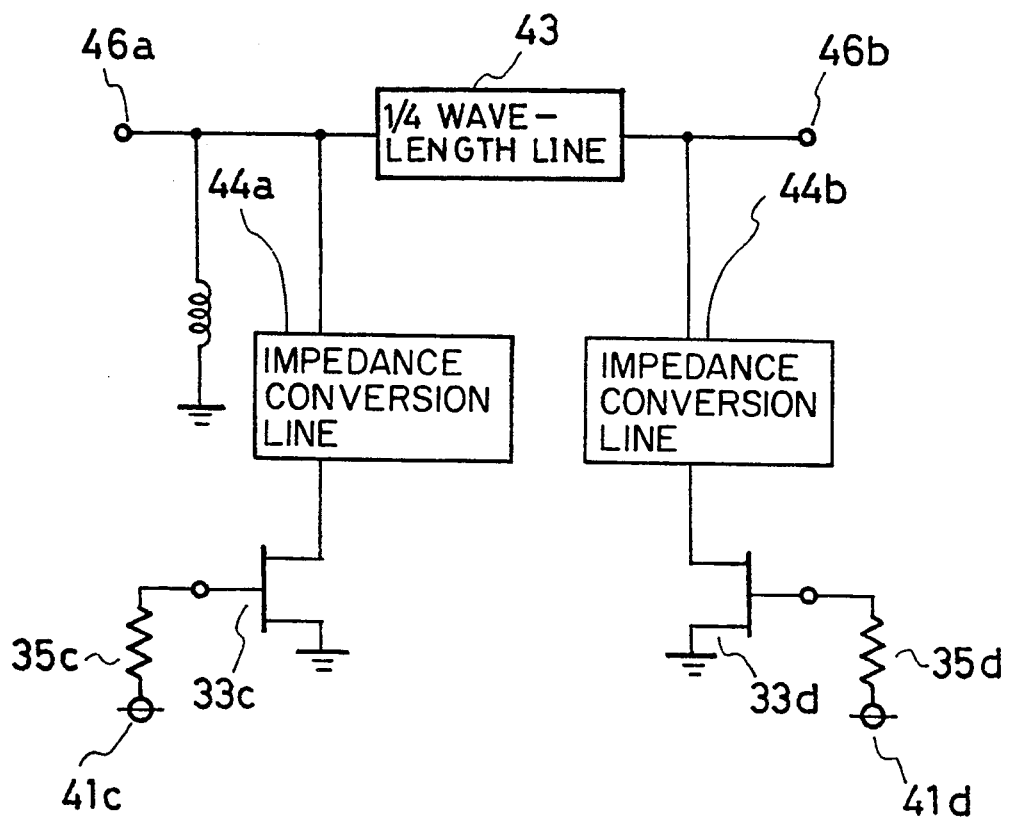
FIG. 15 is a simplified connection diagram of a loading-type field-effect transistor phase shifter.

With this embodiment it is possible to use output signals $13_1$ to $13_L$ of the control circuit 5 to directly drive the RF devices 1 to 4 shown in FIGS. 13 to 15 and without using the level conversion circuit 6. This is accomplished by connecting the voltage supply terminal of the control circuit 5, comprising a CMOS gate array or the like, to the ground and applying negative voltage to the ground terminal of the control circuit 5, thereby converting the input voltage of the control data signal input to a negative potential output voltage signal.

Embodiment 2

Figure 2:
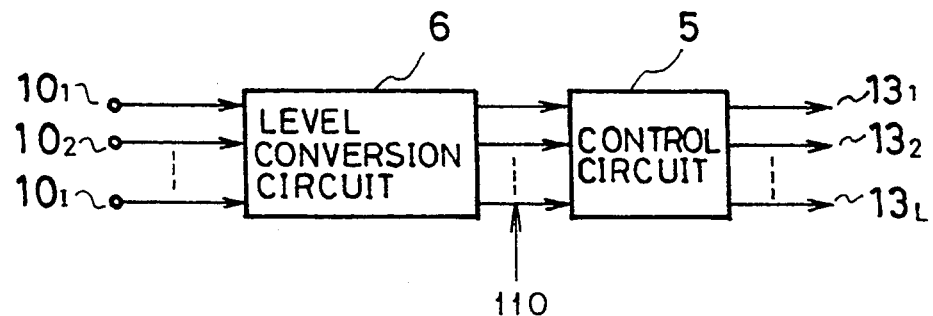
FIG. 2 is a block diagram of a control section of another embodiment according to the present invention.

FIG. 2 is a block diagram of a control section of the transmit-receive 7 module according to another embodiment of the present invention.

For the embodiment in FIG. 1, the output voltage of the control signal data 13, output from the control circuit 5, is converted to a negative potential signal. However, in the second embodiment it is also possible to convert the output voltage 13 to a positive potential signal by placing a level conversion circuit 6 in front of the control circuit 5 as shown in FIG. 2, to convert the inputted positive logic signal 10 into a negative logic signal 110 before inputting the negative logic signal to the control circuit 5. With this embodiment the same effect as the first embodiment is obtained because it is unnecessary to set the level conversion circuit 6 for every RF devices 1 to 4 as was required by the prior art.

Figure 3:
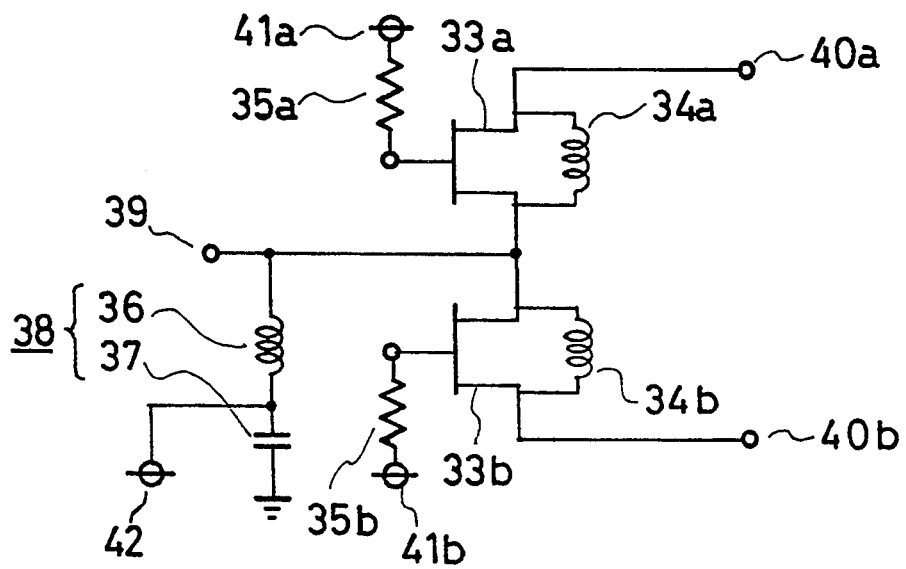
FIG. 3 is a simplified connection diagram of a single-pole double-throw field-effect transistor switch according to the present invention.
Figure 4:
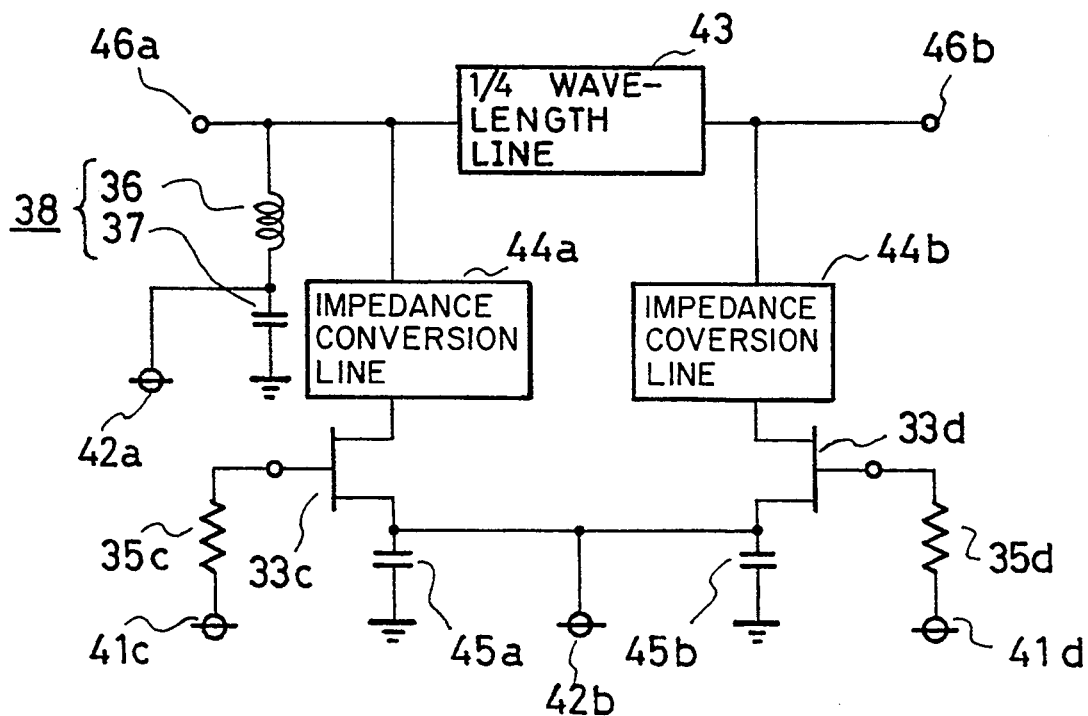
FIG. 4 is a simplified connection diagram of a loading-type field-effect transistor phase shifter according to the present invention.

FIG. 3 is a simplified schematic diagram of a single-pole double-throw field-effect transistor switch according to the present invention and FIG. 4 is a simplified schematic diagram of a loading-type field-effect transistor phase shifter according to the present invention. The portions that are the same or equivalent to those according in the prior art devices in FIGS. 14 and 15 are provided with the same symbol and reference numeral, and their description is herein omitted.

In the SPDT switch of FIG. 3, numeral 36 is an RF choke inductor and 37 is a capacitor which together comprising bias circuit 38. Numeral 42 is a negative voltage applying terminal for driving the drains and sources of the field-effect transistors 33a and 33b with a negative voltage so that the gates may be driven with a positive voltage.

In the phase shifter of FIG. 4, 42a and 42b are negative voltage applying terminals and 45a and 45b are DC preventing capacitors for driving the gates of the field-effect transistors 33c and 33d with positive voltage.

The following is a description both devices operations.

The bias circuit 38 in FIG. 3 makes it possible to drive the field-effect transistors 33a and 33b with a voltage applied to the gate voltage applying terminals 41a and 41b which is at a positive potential by applying a negative voltage signal to the negative voltage applying terminal 42 thereby biasing the drains and sources of the field-effect transistors 33a and 33b at a negative potential.

In contrast, referring to the prior art switch of FIG. 14, when applying the voltage of −V (a value equal to cut-off voltage or lower) to the gate voltage applying terminal 41a and a voltage of 0 to the gate voltage applying terminal 41b, field-effect transistor 33a is turned off and the field-effect transistor 33b is turned on. Therefore, the RF signal input to the RF signal input/output terminal 39 will pass to the RF signal output terminal 40 and the RF signal output terminal 40a will be isolated by the FET open circuit 3a. Alternatively, when applying the voltage of 0 to the gate voltage applying terminal 41a and the voltage of −V to the gate voltage applying terminal 41b, the field-effect transistor 33a is turned on and the field-effect transistor 33b is turned off and therefore, the RF signal input to the RF signal input terminal 39 will pass to the RF signal output terminal 40a and will not pass to the RF signal output terminal 40b.

Referring now to FIG. 4, the bias circuits 38 and 45 makes it possible to drive the field-effect transistors 33c and 33d with a positive potential voltage signal applied to the gate voltage applying terminals 41c and 41d by RF grounding the sources of the field-effect transistors 33c and 33d through the DC preventing capacitors 45a and 45b, applying a negative voltage to the negative voltage applying terminals 42a and 42b, and thereby biasing the drains and sources of the field-effect transistors 33c and 33d at a negative potential via the bias circuit 38.

In contrast, referring to the prior art phase shifter of FIG. 15, the field-effect transistors 33c and 33d may be turned on such that the input impedance of the impedance conversion lines 44a and 44b become inductive by applying a voltage to the gate voltage applying terminals 41c and 41d which is 0. If the field-effect transistors 33c and 33d are turned off, the input impedance through the impedance conversion lines 44a and 44b becomes capacitive, by applying a gate voltage to terminals 41c and 41d which is $-V$ (a value equal to the cut-off voltage or lower). Thus, because the input impedance of the impedance conversion lines 44a and 44b changes from inductive to capacitive, the RF signal input to the RF signal input/output terminal 46a and output from the RF signal input/output terminal 46b will be phase shifted by a predetermined phase change wherein the amount of the phase change is determined by the characteristic impedance and the length of the impedance conversion lines 44a and 44b.

Therefore, the same effect as the prior art is obtained with this embodiment except that the field-effect transistors 33c and 33d can now directly be driven by a positive potential signal, thereby eliminating the need to convert the output voltage of the control circuit 5 into a negative potential signal, and the need for the level conversion circuit 6. In FIGS. 3 an 4, it is assumed that N-channel field-effect transistors are used. However, by using P-channel field-effect transistors, the same effect can also be obtained without the need for any signal level conversion or special biasing circuits since the gate of a field-effect transistor can directly be driven by positive voltage control signal.

Figure 5:
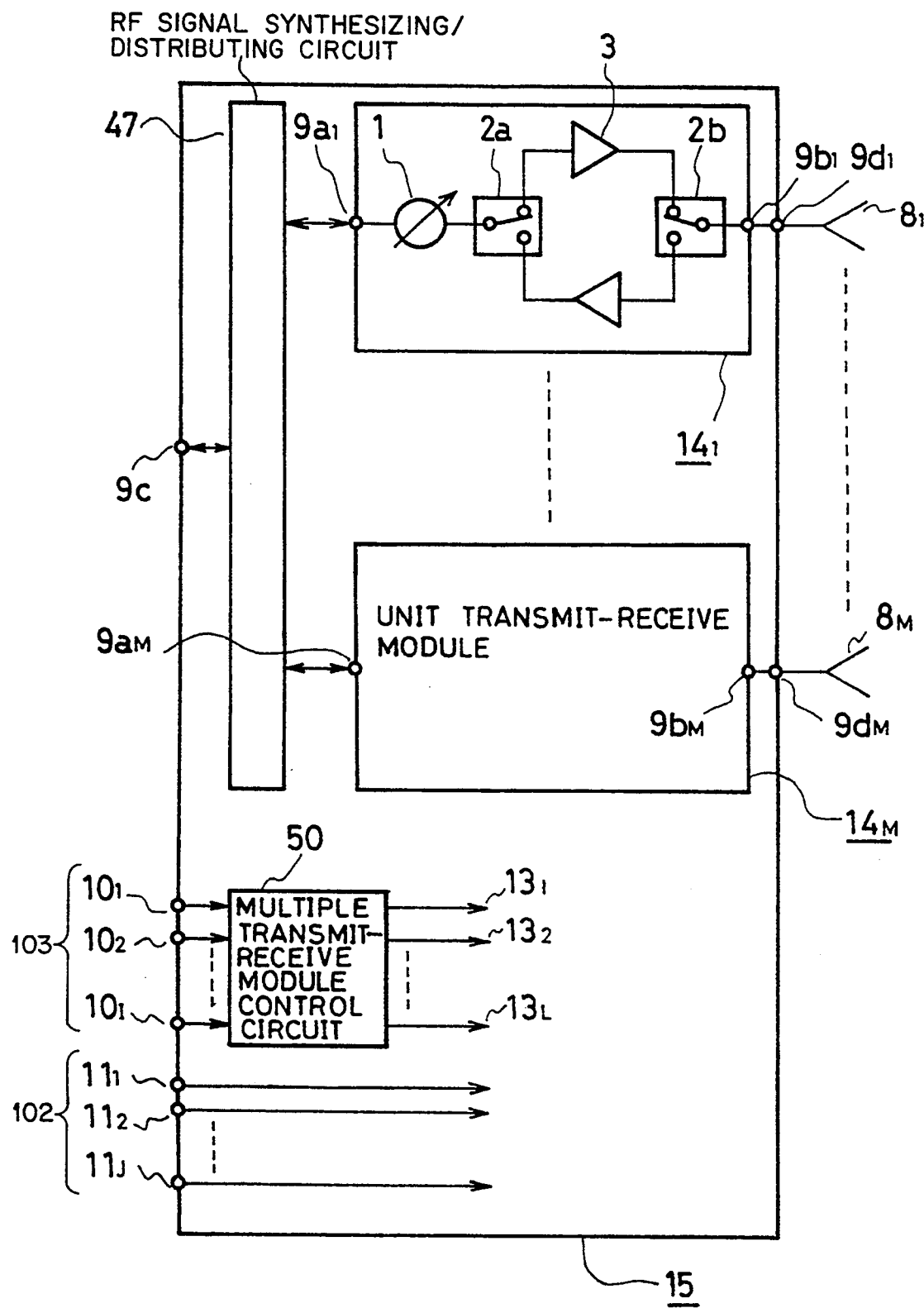
FIG. 5 is a block diagram of a transmit-receive module subarray according to the present invention.

FIG. 5 is a block diagram of a transmit-receive module subarray according to the present invention. In FIG. 5, $14_1$ to $14_M$ are unit transmit-receive modules, 15 is a transmit-receive module subarray, and 50 is a multiple transmit-receive module control circuit for driving the plurality of unit transmit-receive modules $14_1$ to $14_M$. The transmit-receive module subarray 15 comprises transmit-receive modules $14_1$ to $14_M$, an RF signal synthesizing/distributing circuit 47, and the multiple transmit-receive module control circuit 50.

The following is the description of operations of the transmit-receive module subarray. In FIG. 5, the RF signal input to the RF signal input/output terminal 9c is distributed by the RF signal synthesizing/distributing circuit 47 to the RF signal input/output terminals $9_{a1}$ to $9_{aM}$ of the unit transmit-receive modules $14_1$ to $14_M$, the signal to be transmitted is provided with a predetermined phase shift and amplified in the manner described above with respect to transmit-receive modules $7_1$ to $7_N$, an the signal is then emitted into space through the RF signal input/output terminals $9_{b1}$ to $9_{bM}$ and element antennas $8_1$ to $8_M$.

A radio wave incoming from space is received by the element antennas $8_1$ to $8_M$ and is input to the unit transmit-receive modules $14_1$ to $14_M$ through the RF signal input/output terminals $9_{d1}$ to $9_{dM}$ and $9_{b1}$ to $9_{bM}$, the received signal is then amplified and provided with predetermined phase shift in the manner described above with respect to transmit-receive modules $7_1$ to $7_N$. The received signal is then output by the RF signal input/output terminals $9_{a1}$ to $9_{aM}$, synthesized by the RF signal synthesizing/distributing circuit 47, as best shown in FIG. b, and outputted to the RF receiver as received signal 101.

The supply voltages 102 for each unit transmit-receive modules $14_1$ to $14_M$ are fed to the supply voltage input terminals $11_1$ to $11_j$, and the control signal 103 for controlling each module, is input to the control signal input/output terminals $10_1$ to $10_I$. In this embodiment, it is possible to directly drive the unit transmit-receive modules $14_1$ to $14_M$ by the multiple transmit-receive module control circuit without the need for a level conversion circuit by biasing the multiple transmit-receive module control circuit 50 to handle negative potential data similarly to the embodiment 1 described above, and by providing the circuit 50 with a function for computing the phase settings of the multiple transmit-receive modules in accordance with the serial data inputted from the control signal input/output terminals $10_1$ to $10_I$. The multiple transmit-receive control module control circuit also includes a serial-parallel signal conversion function, in addition to the function for converting the control signal data input to the control signal input/output terminals $10_1$ to $10_I$ into a negative potential.

Thus, with this embodiment it is unnecessary to provide each of the unit transmit-receive modules $14_1$ to $14_M$ with an individual control circuit 5 and, moreover, it is possible to greatly downsize the size of each transmit-receive module 14 where the necessary number of control signal input connectors and supply voltage input connectors is reduced to one set for each transmit-receive module subarray.

In the above embodiment, the control signal data 103 input to the control signal input/output terminals $10_1$ to $10_I$ is converted to a negative potential. However, it is also possible to convert the control signal data input to the control signal input/output terminals $10_1$ to $10_I$ into a positive potential, as described above with respect to FIG. 2, by placing the level conversion circuit 6 in front of the multiple transmit-receive module control circuit 50 and converting a positive potential control signal into a negative potential control signal and then to input the negative potential control signal to the multiple transmit-receive module control circuit 50.

Figure 6:
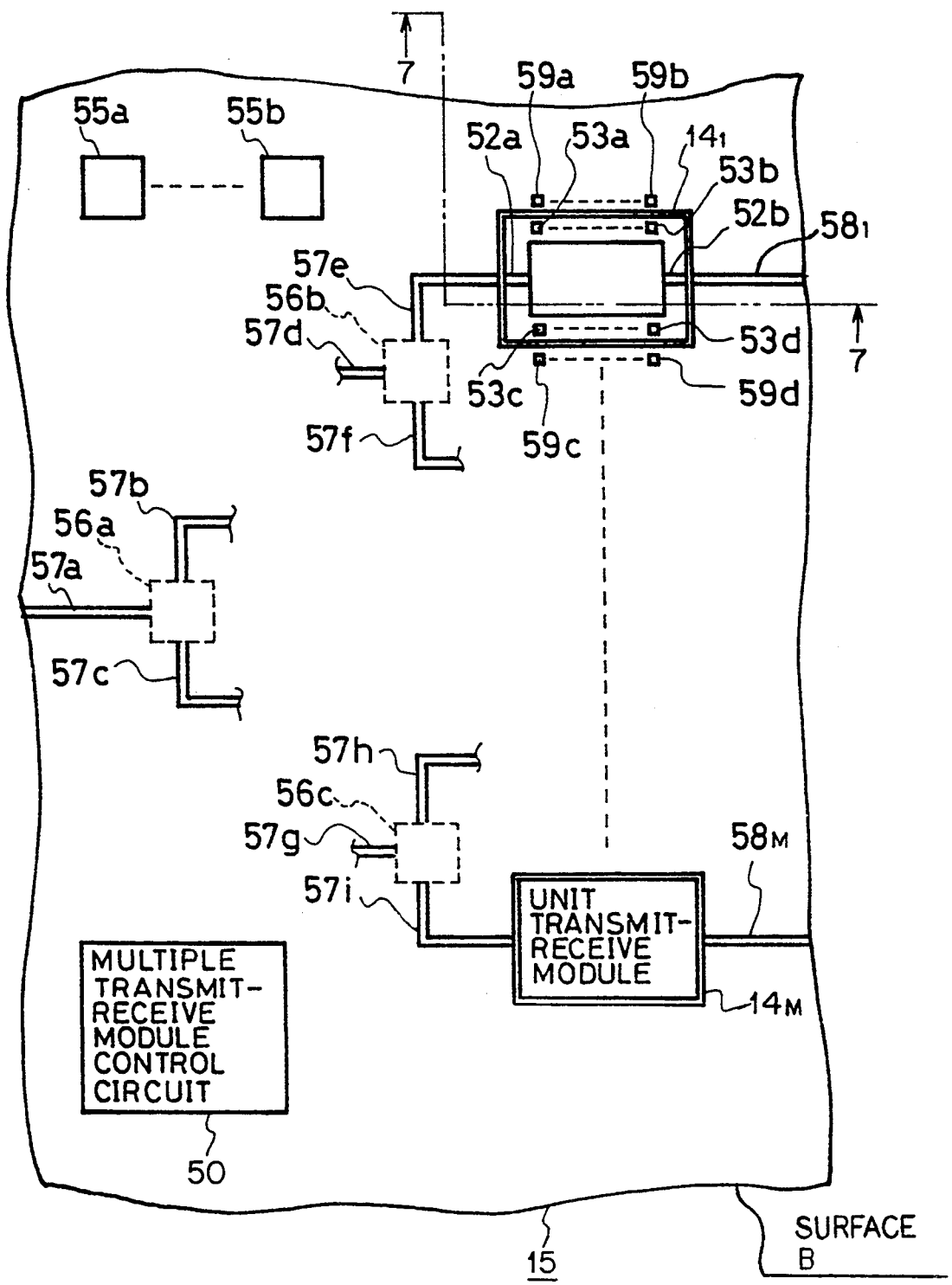
FIG. 6 is a diagram showing an example of mounting a transmit-receive module subarray according to the present invention.

FIG. 6 is a diagram showing an embodiment of the transmit-receive module subarray 15 according to the present invention. In FIG. 6, $14_1$ to $14_M$ are packaged unit transmit-receive modules; 52a and 52b are RF signal input/output microstrip lines for each unit transmit-receive modules $14_1$ to $14_M$; 53a to 53d are power- and driving-signal input pads for the unit transmit-receive modules $14_1$ to $14_M$; 50 is a packaged multiple transmit-receive module control circuit; 55a and 55b are energy banks of capacitors for use with pulsing the RF devices and preventing power surges; 56a to 56c are individual RF signal synthesizing/distributing circuits which together comprise the RF signal synthesizing/distributing circuit 47 and which, in the preferred embodiment, are Wilkinson power distributor circuit made from strip lines; 57a to 57i are strip lines for connecting each transmit-receive modules $14_1$ to $14_M$ and RF signal synthesizing/distributing circuits 56a to 56c; $58_1$ to $58_M$ are strip lines for connecting each transmit-receive module $14_1$ to $14_M$ and element antennas $8_1$ to $8_M$; 59a to 59d are power- and driving-signal input/output pads for feeding power and driving signals to the transmit-receive modules $14_1$ to $14_M$ and 15 is the transmit-receive module subarray.

Figure 7:
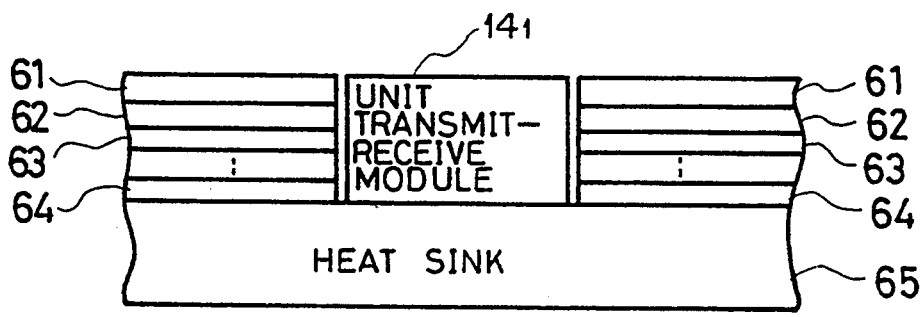
FIG. 7 is a sectional view of the mounted transmit-receive module subarray in FIG. 6, taken along the line A—A' of FIG. 6.

FIG. 7 is sectional view of a transmit-receive module subarray 15 in FIG. 6, taken along the line A—A' of FIG. 6. In FIG. 7, numeral 61 is a first dielectric layer provided with the strip lines 57e and 58i and power- and driving-signal input/output pads 59a and 59b on its top surface, 62 is a second dielectric layer with ground patterns formed at its top surface, 63 is a third dielectric layer and includes wiring and power distribution patterns formed on its top surface, 64 is an N-th dielectric layer provided with wiring and power distribution patterns formed on its top surface. Through-holes for continuity between connections are formed through the dielectrics 61 and 62 and between 63 to N-th dielectric 64. Numeral 65 is a heat sink for displacing heat and also serving as a structural member for securing the dielectrics layers 61 to 64 and the unit transmit-receive module $14_1$.

For the above embodiment, the unit transmit-receive module $14_1$ is mounted on the heat sink 65 by forming holes through the multilayer dielectrics 61 to 64. However, it is also possible to mount the unit transmit-receive module $14_1$ on any top surface of any one of the dielectrics layers 61 to 64 by forming a hole through the dielectric layers above that layer. The multiple transmit-receive module control circuit 50 is mounted on the dielectric 61 or on the top surface of any other dielectric layer by forming holes through the multilayer dielectrics 61 to 64.

Referring now to FIG. 6 the unit transmit-receive modules $14_1$ to $14_M$ are packaged by the packaging technique disclosed in the 1991 official gazette of Japanese Patent Laid-Open No. 253098 and similarly the multiple transmit-receive module control circuit 50 is packaged by the above technique.

Referring to FIGS. 6 and 7, the power-and driving-signal input pads 59a to 59d for driving each transmit-receive module 51 are formed at the top of the dielectric 61 in FIG. 7, and are also connected to the supply voltage input terminal 11, as best seen in FIG. 5, of the multiple transmit-receive module control circuit 50 by the power- and driving-signal wiring patterns and through-holes formed on the third dielectric 63 to the N-th dielectric 64 layers and via the through-holes formed through the dielectrics layers 61 and 62. Any heat produced by the unit transmit-receive module $52_1$ is emitted through the heat sink 65.

For the embodiment in FIG. 6, the individual transmit-receive modules $51_1$ to $51_M$ can be arranged to form an array and connected to the antenna elements via the strip lines $58_1$ to $58_M$. Therefore, it is possible to easily constitute an antenna array by connecting antennas elements to the strip lines $58_1$ to $58_M$ or by alternatively directly forming a printed circuit antenna (e.g. printed dipole antenna) on the top surface of the dielectric 61, with the RF ground on the top surface of dielectric layer 62, and to form a conformal array antenna by curving the top surface B of dielectric layer 61.

Figure 8:
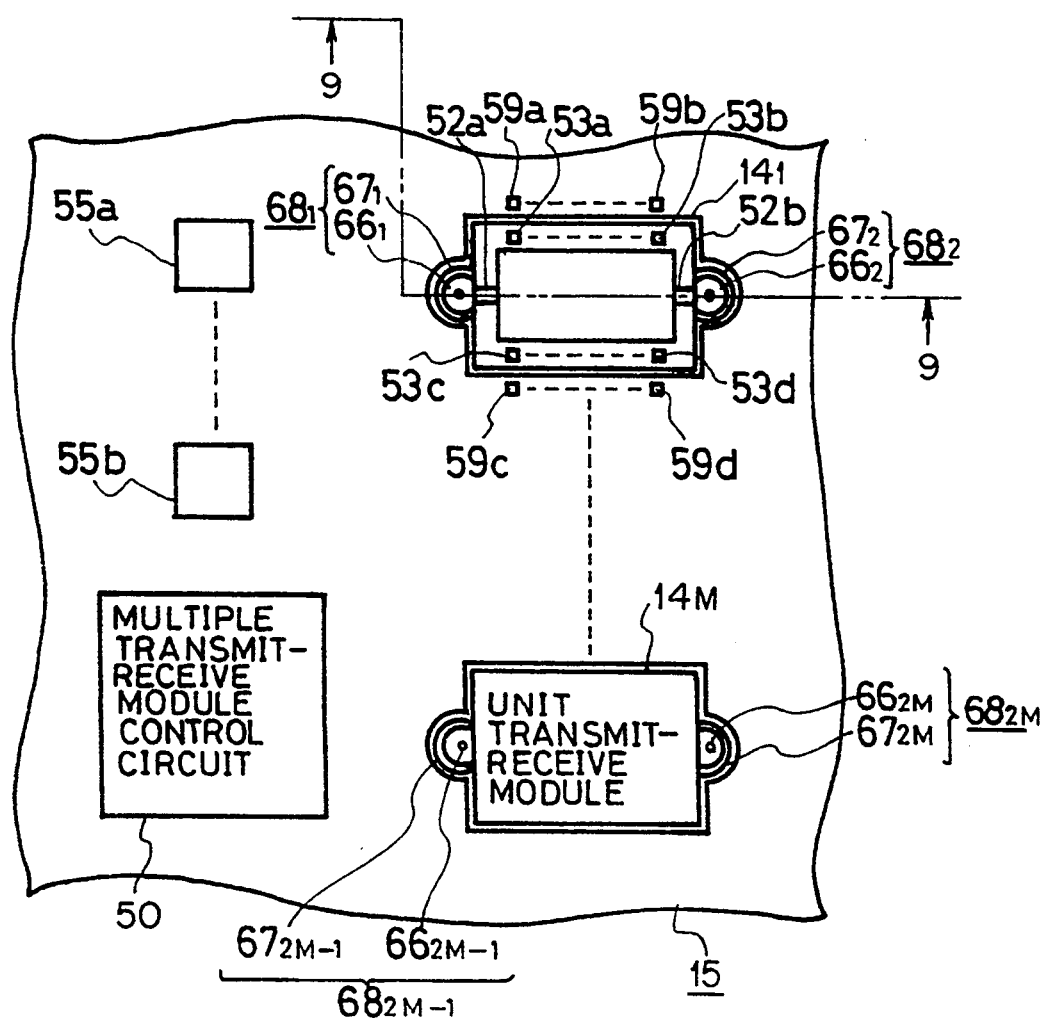
FIG. 8 is a diagram showing another example of mounting a transmit-receive module subarray according to the present invention.
Figure 9:
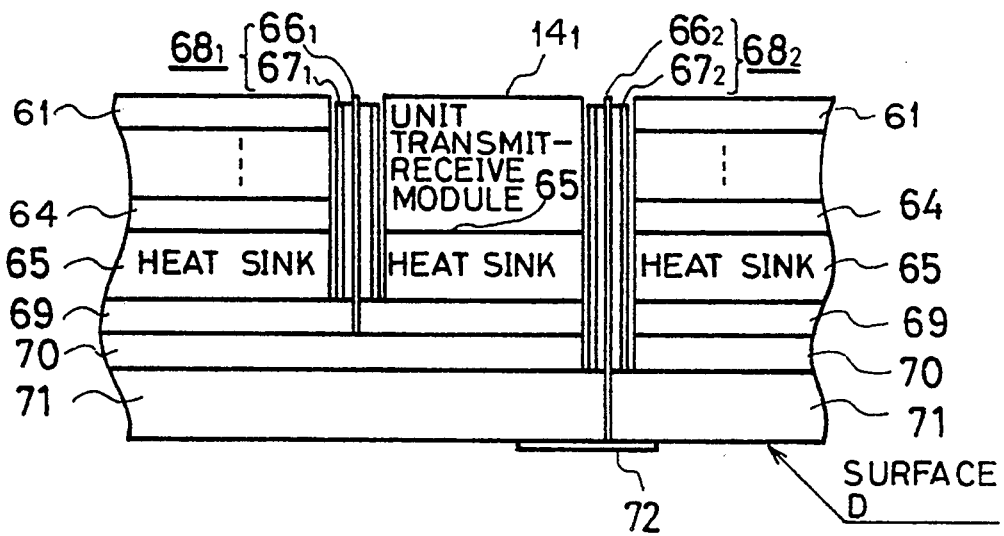
FIG. 9 is a sectional view of the mounted transmit-receive module subarray in FIG. 8, taken along the line C—C' of FIG. 8.

FIG. 8 is a diagram showing another embodiment for constructing a transmit-receive module subarray according to the present invention and FIG. 9 is a sectional view of the mounted transmit-receive module subarray in FIG. 8, taken along the line C—C' of FIG. 8. The portions that are the same as those in FIGS. 6 and 7 are provided with the same symbol and reference numeral and their description is omitted.

In FIGS. 8 and 9, $66_1, 66_2, \ldots, 66_{2M-1}$, and $66_{2M}$ are inner core wires of a coaxial cable for transmitting RF signals, and $67_1, 67_2, \ldots, 67_{2M-1}$, and $67_{2M}$ are outer conductors of the coaxial cable, which together form coaxial lines $68_1, 68_2, \ldots, 68_{2M-1}$, and $68_{2M}$. In FIG. 9, numeral 69 is a first dielectric layer formed below the heat sink 65 with ground patterns formed on its top surface and strip line connections formed on its bottom surface, 70 is a second dielectric layer with ground patterns formed on its bottom surface, and 71 is an Mth dielectric layer with a printed circuit antenna 72 formed on its bottom surface.

In FIG. 8 the embodiment shown is different from the embodiment in FIG. 6, in that the RF signal synthesizing/distributing circuit is formed on the bottom surface of dielectric 69 with ground patterns formed at its top surface. The RF signal synthesizing/distributing circuit and the unit transmit-receive modules $14_1$ to $14_M$ are connected by the coaxial lines $68_1$ to $68_{2M}$.

Moreover, with this embodiment it is possible to easily form a printed circuit antenna on the bottom surface of the dielectric layer 71 (e.g. patch antenna) which can be connected to the unit transmit-receive modules $51_1$ to $51_M$ by the coaxial lines $68_1$ to $68_{2M}$. The antenna array can easily be made a conformal array antenna by curving the surface D of the dielectric layer 71.

FIG. 10 shows a block diagram of a phased array radar incorporating the transmit-receive module subarrays $15_1$ to $15_N$ according to the present invention. Operation of the array is the same as the existing block diagram shown in FIG. 16. However, an advantage is it is possible to greatly simplify and downsize the size of the array because the RF signal synthesizing/distributing circuit 47, supply voltage feed circuit 48, and control signal distributing circuit 49 of FIG. 10 are at least partially within the transmit-receive module subarrays $15_1$ to $15_N$.

Figure 11:
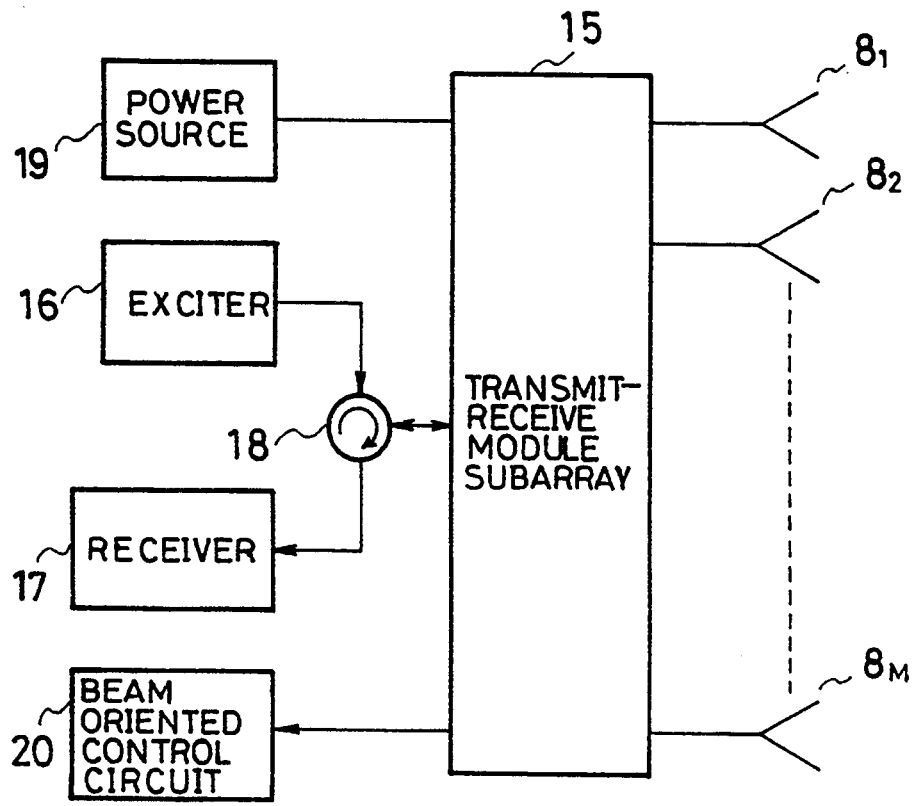
FIG. 11 is another block diagram of the phased array radar according to the present invention.

FIG. 11 is a block diagram showing the case in which the RF signal synthesizing/distributing circuit 47, supply voltage feed circuit 48, and control signal distributing circuit 49 are entirely within the transmit-receive module subarray 15 according to the present invention. In this case, it is possible to further downsize the entire phased array radar.

As described above, the present invention makes it possible to decrease the size and power consumption of a transmit-receive module because input/output signal data of a control circuit is brought into negative voltage and RF devices are directly driven and to decrease the size an deposer cons of a phased array radar and improve the mounting property of the radar.

What is claimed is:

1. In a phased array radar having a plurality of element antennas, the phased array radar comprising:
   a plurality of transmit-receive modules including a phase shifter for changing a phase of RF signals, a high-power amplifier for amplifying transmission RF signals, a low-noise amplifier for amplifying received RF signals, a pair of duplexers for switching a propagation path between the transmission and received RF signal amplifiers
   an exciter for generating and outputting transmission RF signals;
   a receiver for processing received RF signals from each transmit-receive module;

an RF signal synthesizing/distributing circuit for distributing transmission RF signals from the exciter to each transmit-receive module and for synthesizing received RF signals from each transmit-receive module and outputting the synthesized received signal to the receiver;

a power source and supply voltage feed circuit for feeding a supply voltage to each transmit-receive module;

a beam oriented control circuit for generating and outputting a negative potential control signal for controlling each transmit-receive module; and a control signal distributing circuit for receiving the control signal and distributing the control signal to an individual control circuit within each transmit-receive module, wherein the individual control circuit comprises a gate array which receives the negative potential control signal, converts the negative potential control signal to a driving signal and outputs the driving signal to the phase shifter, the duplexers, the high-power and the low-noise amplifiers within each transmit-receive module.

9. In a phased array radar according to claims 2, 7, 8 or 10, wherein the individual control circuit comprises a CMOS gate array operating at a negative voltage.

2. In a phased array radar having a plurality of element antennas, the phase array radar comprising:

a plurality of transmit-receive modules including a phase shifter for changing a phase of RF signals, a high-power amplifier for amplifying transmission RF signals, a low-noise amplifier for amplifying received RF signals, a pair of duplexers for switching a propagation path between the transmission and received RF signal amplifiers;

an exciter for generating and outputting transmission RF signals;

a receiver for processing received RF signals from each transmit-receive module;

an RF signal synthesizing/distributing circuit for distributing transmission RF signals from the exciter to each transmit-receive module and for synthesizing received RF signals from each transmit-receive module and outputting the synthesized received signal to the receiver;

a power source and supply voltage feed circuit for feeding a supply voltage to each transmit-receive module;

a beam oriented control circuit for generating and outputting a positive potential control signal for controlling each transmit-receive module;

a control signal distributing circuit for receiving the positive potential control signal and distributing the control signal to each transmit-receive module, wherein each transmit-receive module includes an individual control circuit comprising a gate array which receives a negative potential control signal, converts the negative potential control signal to a driving signal and outputs the driving signal to the phase shifter, the duplexers, the high-power and the low-noise amplifiers within each transmit-receive module; and a level conversion circuit at an input side of the individual control circuit for receiving the positive potential control signal and converting the positive potential control signal to the negative potential signal and for outputting the negative potential signal to the individual control circuit.

3. In a phased array radar having a plurality of element antennas, the phased array radar comprising:

a plurality of transmit-receive modules including a phase shifter for changing a phase of RF signals, a high-power amplifier for amplifying transmission RF signals, a low-noise amplifier for amplifying received RF signals, a pair of duplexers for switching a propagation path between the transmission and received RF signal amplifiers, wherein the phase shifter and the duplexers include at least one p-channel field effect transistor;

an exciter for generating and outputting transmission RF signals;

a receiver for processing received RF signals from each transmit-receive module;

an RF signal synthesizing/distributing circuit for distributing transmission RF signals from the exciter to each transmit-receive module and for synthesizing received RF signals from each transmit-receive module and outputting the synthesized received signal to the receiver;

a power source and supply voltage feed circuit for feeding a supply voltage to each transmit-receive module;

a beam oriented control circuit for generating and outputting a positive potential control signal for each transmit-receive module; and a control signal distributing circuit for receiving the positive potential control signal and distributing the control signal to each transmit-receive module, wherein each transmit-receive module includes an individual control circuit comprising a gate array which receives the control signal, converts the positive potential control signal to a driving signal and outputs the driving signal directly to the phase shifter, the duplexer, the high-power and the low-noise amplifiers within each transmit-receive module.

4. A transmit-receive module according to claim 3, wherein the phase shifter includes a pair of shunt field effect transistors, a source of each field effect transistor being connected to RF ground through a capacitor, and bias circuits for biasing both a drain and the source of each field effect transistor to a negative potential so that a gate of each field effect transistor may be driven with the positive potential control signal.

5. A transmit-receive module according to claim 3, wherein each of the duplexers includes a pair of field effect transistors and bias circuits for biasing both a drain and a source of each field effect transistor to a negative potential so that a gate of each field effect transistor may be driven with the positive potential control signal.

15. In a phased array radar according to claims 3 or 10, wherein the individual control circuit comprises a CMOS gate array operating at a positive voltage.

6. In a phased array radar having a plurality of element antennas, the phased array radar comprising:

a plurality of transmit-receive modules including a phase shifter for changing a phase of RF signals, a high-power amplifier for amplifying transmission RF signals, a low-noise amplifier for amplifying received RF signals, a pair of duplexers for switching a propagation path between the transmission and received RF signal amplifiers;

an exciter for generating and outputting transmission RF signals;

a receiver for processing received RF signals from each transmit-receive module;

an RF signal synthesizing/distributing circuit for distributing transmission RF signals from the exciter to each transmit-receive module and for synthesizing received RF signals from each transmit-receive module and outputting the synthesized received signal to the receiver;

a power source and supply voltage feed circuit for feeding a supply voltage to each transmit-receive module;

a beam oriented control circuit for generating and outputting a serial control signal for controlling the plurality of transmit-receive modules;

a control signal distributing circuit for receiving the serial control signal and for distributing the serial control signal to a multiple transmit receive module control circuit, wherein the multiple transmit receive module control circuit includes a serial-parallel converter for converting the serial control signal to parallel output signals for outputting the parallel control signals directly to the phase shifter, the duplexers, the high-power and the low-noise amplifiers within the plurality of transmit-receive modules; and a transmit-receive module subarray including the plurality of transmit-receive modules, the multiple transmit receive module control circuit, the RF signal synthesizing/distributing circuit, the supply voltage feed circuit, and the control signal distributing circuit.

7. A transmit-receive module subarray according to claim 6, wherein:

the serial control signal is at a negative potential; and the multiple transmit-receive module control circuit comprises a gate array.

8. A transmit-receive module subarray according to claim 6, wherein:

the serial control signal is at a positive potential;

the transmit-receive module subarray further includes a level conversion circuit at an input side of the multiple transmit-receive module control circuit for converting the positive potential control signal to a negative potential signal and for outputting the negative potential signal to the multiple transmit-receive module control circuit; and the multiple transmit-receive module control circuit comprises a gate array.

10. A transmit-receive module subarray according to claim 6, wherein the transmit-receive module subarray further comprises:

a heat sink having a top surface;

an N-dielectric substrate disposed above the top surface of the heat sink, including:

a first dielectric layer including a top and bottom surface and wherein the RF signal synthesizing/distributing circuit and a plurality of RF signal input/output pads are formed on the top surface;

a second dielectric layer beneath the first dielectric layer including a top and bottom surface wherein the top surface of the second dielectric layer is joined to the bottom surface of the first dielectric layer and the top surface of the second dielectric layer is connected to RF ground;

a third dielectric layer beneath the second dielectric layer including a top and bottom surface wherein a wiring and power distribution pattern is formed on the top surface and through holes are formed through the dielectric layer for connection to the bottom surface; and an N-th dielectric layer including a top and bottom surface wherein a wiring and power distribution pattern is formed on the top surface and the bottom surface is mounted to the heat sink;

a plurality of cut-outs through the N-dielectric substrate layers for mounting the plurality of transmit-receive modules to the heat sink or to the top surface of any of the N-dielectric layers.

11. A transmit-receive module subarray according to claim 10, wherein a printed circuit antenna array is formed on the top surface of the first dielectric layer.

12. A transmit-receive module subarray according to claim 11, wherein a conformal printed circuit antenna array is formed by curving the top surface of the first dielectric layer.

13. A transmit-receive module subarray according to claim 10, wherein the transmit-receive module is connected to an antenna element by a transmission line formed on the top surface of the first dielectric layer.

14. A transmit-receive module subarray according to claim 10, wherein the RF signal synthesizing/distributing circuit is a Wilkinson power dividing circuit which is formed on the top surface of any of the N-dielectric layers and is connected to the transmit-receive modules via transmission lines formed on the top surface of the first dielectric layer and by through holes formed through the dielectric layers.

16. A transmit-receive module subarray according to claim 6, wherein the transmit-receive module subarray further comprises:

a heat sink having a top and bottom surface;

an N-layer dielectric substrate disposed above the top surface of the heat sink, including:

a first dielectric layer including a top and bottom surface and wherein a plurality of RF signal and control signal input/output pads are formed on the top surface;

a second dielectric layer beneath the first dielectric layer including a top and bottom surface wherein the top surface of the second dielectric layer is joined to the bottom surface of the first dielectric layer and the top surface of the second dielectric layer is connected to RF ground;

a third dielectric layer beneath the second dielectric layer including a top and bottom surface wherein a wiring and power distribution pattern is formed on the top surface and through holes are formed through the dielectric layer for connection to the bottom surface; and an N-th dielectric layer including a top and bottom surface and wherein a wiring and power distribution circuit is formed on the top surface and the bottom surface is mounted on the top surface of the heat sink;

a plurality of cut outs through the N-layer dielectric substrate for mounting the plurality of transmit-receive modules to the heat sink or to the top surface of any of the N-dielectric layers;

an M-layer dielectric substrate disposed below the heat sink, including:

a first dielectric layer including a top and bottom surface wherein the top surface of the first dielectric layer is mounted to the bottom surface of the heat sink and wherein the RF signal synthesizing/distributing circuit is formed on the bottom surface of the first dielectrical layer;

a second dielectric layer disposed beneath the first dielectric layer including a top and bottom surface wherein the top surface of the second dielectric layer is joined to the bottom surface of the first dielectric layer and the bottom surface of the second dielectrical layer is connected to an RF ground;

an Mth dielectric layer including a top and bottom surface; and a bore hole having a coaxial line extending therein, the bore hole extending through the N-layer dielectric substrate and the heat sink, and wherein a first end of the coaxial line is coupled to a first RF signal input/output pad and a second end of the coaxial line is coupled to the bottom surface of the first dielectric layer of the M-layer dielectric.

17. A transmit-receive module subarray according to claim 16, further comprising:

a printed circuit antenna element array formed on the bottom surface of the Mth dielectric layer;

a through hole formed through the Mth dielectric layer for connecting each element of the antenna element array to the top surface of the Mth layer;

a bore hole having a coaxial line extending therein, the bore hole extending through the N-layer dielectric, the heat sink, and M-1 layers of the M-layer dielectric, and wherein a first end of the coaxial line is coupled to a second RF signal input/output pad and a second end of the coaxial line is coupled to the through hole.

18. A transmit-receive module subarray according to claim 15, wherein a conformal printed circuit antenna array is formed by curving the bottom surface of the Mth dielectric layer.

19. A transmit-receive module subarray according to claim 10 or 16, further comprising a plurality of capacitors on the top surface of the first layer of the N-layer dielectric substrate and connected via a plurality of through holes formed through at least the first and second layer of the N-layer dielectric substrate to the wiring and distribution patterns formed on any of the third through the N-th dielectric layers.

20. A transmit-receive module subarray according to claim 6, wherein the RF signal synthesizing/distributing circuit, the supply voltage feed circuit, and the control signal distributing circuit are partially within the transmit receive module subarray.

21. A transmit-receive module subarray according to claim 6, wherein the RF singal synthesizing/distributing circuit, the supply voltage feed circuit, and the control signal distributing circuit are completely within the transmit-receive module subarray.

22. A transmit-receive module subarray according to claim 6, where the serial control signal is at a positive potential; and the multiple transmit-receive module control circuit comprises a gate array.

* * * * *